(12) United States Patent
Zabtcioglu

(10) Patent No.: US 6,860,542 B1
(45) Date of Patent: Mar. 1, 2005

(54) MOTOR VEHICLE DOOR ATTACHMENT AND DETACHMENT

(76) Inventor: Fikret M. Zabtcioglu, 198 - 106th Ave. SE., Apt #8, Bellevue, WA (US) 98004

( * ) Notice: Subject to any disclaimer, the term of this patent is extended or adjusted under 35 U.S.C. 154(b) by 0 days.

(21) Appl. No.: 10/775,355

(22) Filed: Feb. 10, 2004

Related U.S. Application Data

(63) Continuation-in-part of application No. 10/703,611, filed on Nov. 7, 2003.

(51) Int. Cl.[7] .................................................. B60J 5/04
(52) U.S. Cl. .......................... 296/146.11; 296/187.01; 292/144; 292/DIG. 22; 49/141
(58) Field of Search ..................... 296/187.01, 146.1, 296/146.4, 149, 147, 148, 146.9, 146.11; 292/144, DIG. 65, DIG. 17, DIG. 2; 49/141; 180/289

(56) References Cited

U.S. PATENT DOCUMENTS

| | | | | | |
|---|---|---|---|---|---|
| 3,336,066 A | * | 8/1967 | Knapp | ......................... | 292/333 |
| 3,431,998 A | * | 3/1969 | Martin | ......................... | 180/281 |
| 3,776,588 A | * | 12/1973 | Sobajima et al. | ......... | 296/146.9 |
| 5,224,752 A | * | 7/1993 | Marshall | ................... | 296/146.1 |
| 5,806,917 A | * | 9/1998 | Townsend | .................... | 296/202 |
| 6,305,736 B1 | * | 10/2001 | Enomoto et al. | ......... | 296/146.1 |
| 6,312,045 B2 | * | 11/2001 | Kitagawa | ............... | 296/187.12 |
| 6,588,532 B1 | * | 7/2003 | Adams et al. | .............. | 180/271 |
| 6,616,214 B2 | * | 9/2003 | Wattebled | ................ | 296/146.1 |
| 6,676,201 B2 | * | 1/2004 | Im et al. | ...................... | 296/207 |
| 2001/0038227 A1 | * | 11/2001 | Enomoto et al. | ......... | 296/146.1 |
| 2003/0067188 A1 | * | 4/2003 | Go | ......................... | 296/146.11 |
| 2003/0111863 A1 | * | 6/2003 | Weyerstall et al. | ...... | 296/146.1 |

* cited by examiner

*Primary Examiner*—Patricia L. Engle
(74) *Attorney, Agent, or Firm*—Dean A. Craine

(57) ABSTRACT

A method and motor vehicle door attachment system that automatically disengages the hinges on the doors on a motor vehicle, in order to provide immediate access to occupants by medical and rescue personnel, that also provides extra room for rescue efforts by the medical personnel. System includes electronic sensor that unlocks an intermediate member onto which the hinges on a door are attached. During an accident the intermediate members are unlocked from the motor vehicle and thereby allow the doors along with the hinges to be removed from the vehicle. A system that enables immediate and secure removal of the doors along with the hinges from a motor vehicle is presented as what is new in the art.

12 Claims, 12 Drawing Sheets

MOTOR VEHICLE DOOR ATTACHMENT AND DETACHMENT

This is a continuation-in-part application of U.S. patent application (Ser. No. 10/703,611) filed on Nov. 7, 2003.

BACKGROUND OF THE INVENTION

1. Field of the Invention

This present invention generally relates to motor vehicle door attachment systems, and more particularly to attachment system that allow the door to be easily removed from the motor vehicle after an accident.

2. Description of the Related Art

Every year there are approximately 42,000 crash deaths. Half of the victims die without even being transported to a medical treatment facility! There are 250,000 life threatening injuries, 500,000 hospitalizations, 2,000,000 disabled by injuries and 4,000,000 emergency department visits occur that are due to motor vehicle related accidents. In America alone, excluding Europe and other countries, nearly 17 million crashes that involve 27 million vehicles occur yearly. Motor vehicle accidents injuries result in about $100 billion in economic cost. $350 billion is the cost to the national economy that also includes value for pain and suffering of people involved.

After a motor vehicle accident, it is important to remove the injured driver and passengers from the motor vehicle very quickly and without causing further injury.

The life threatening injuries that result from serious crashes in the US each year are: 70,000 Brain injuries, 4,400 Neck and Spinal Cord injuries, 80,000 Chest and abdominal injuries that include Heart, Lungs, Spleen, Liver and Kidneys. 18,000 Hip and Pelvic Injuries, 35,000 Leg, Ankle and Foot injuries.

In many other countries, due to road infrastructure limitations and uncontrolled traffic mix, there are considerably higher rates of crash injury/fatality involvements as compared to U.S. rates. Therefore, this invention has a global applicability as an improved safety measure for various motor vehicle emergency conditions.

Structural damage makes the access to the injured very difficult for the rescue personnel and often requires heavy duty forced entry and rescue spreading devices for moving and cutting of the damaged motor vehicle parts. Such a process of cutting and spreading rescue means is time consuming and entails additional dangers for the injured. Whereas, often the injured within a motor vehicle must be rescued with utmost care, for example in the case of neck injuries—the injured must be moved slowly only by medical experts—that may involve two rescuers working on one injured person, who therefore would need extra room to make the special maneuvers successfully. Otherwise, the injured can be paralyzed for life.

These safety hazards that occur after accidents, have created a need for an emergency vehicle exit apparatus to automatically enable the vehicle doors to be detached from being jammed in the deformed motor vehicle body. Even if doors can be opened, it is still better to have the extra room for faster rescue operations. Even if the doors open after an accident, doors can still be obstacles against effective rescue operations, if doors remain attached to the damaged motor vehicle. In two door motor vehicles, the ability to remove the doors becomes even more critical for the rescue operations.

In view of the disadvantages of the prior art types of rescue equipment and methods that are mostly devices applied externally, as forced entry devices, heavy duty hydraulic forced entry-spreading devices, there is a need for a motor vehicle accident rescue system that saves time in the efforts of rescue operations and is part of the vehicle.

This system can be built by original equipment manufacturer for new vehicles at factory and may also retrofit older vehicles with some considerable auto mechanics work by licensed auto mechanics.

Former motor vehicle hinge and door systems do not have a fast and reactive removal mechanism for after accident emergency conditions that achieves a swift separation of doors. A search in this field indicated that there is no prior art directly germane to the present invention.

SUMMARY OF THE INVENTION

It is an object of the present invention to provide a motor vehicle door attachment and detachment system that provides an immediate and visible escape route out of a damaged motor vehicle.

It is another object of the present invention to provide such a system that enables swift detachment of the doors, and by removal of the doors, it enables freeing vehicle occupants who are injured and trapped or not trapped but only injured in a vehicle and also to provide the extra room to perform better rescue operations, even if the doors are damaged, wherein the damage can also be the result of any kind-angle- of side impact, other than the front or rear end impacts, and can result in the doors being jammed.

It is further an object of the invention to provide such a system that includes an automatic expulsion system that completely removes the doors from the motor vehicle.

It is further an object of the present invention to provide a such a system new rescue that is relatively inexpensive to manufacture and install and does not require fundamental structural changes to the motor vehicle design.

It is further an object of the present invention to provide such a system which is subject of a low cost OEM production and application on OEM vehicles, with regard to materials, technological methodology and labor, and accordingly is then subject of low prices of sale to the consuming public, thereby making said device for motor vehicle accidents economically available to the end users.

It is further an object of the invention to provide such a system that does not require the use of nuts and bolts to attach or detach doors and closures and does not need removal of the hinges at factory assembly-paint- and paint and body repair shops.

It is further an object of the invention to provide such a system that enables immediate detachment of the doors that could be activated by the vehicle operator with a protected button internally, as for example when the vehicle is not moving but catches fire or when the vehicle is trapped.

It is further an object of the invention to provide such a system that can be easily retrofit on some older model motor vehicles.

It is further an object of the invention to provide a method for loading and unloading cargo that uses a door attachment and detachment system that allows the doors to be easily attached and detached from the motor vehicle.

These and other objects of the invention are met by the motor vehicle door attachment and detachment system disclosed herein, which comprises an intermediate member located inside a cavity formed on a vertical frame member located adjacent the doorway on motor vehicle. Attached to the external surface of the intermediate members are upper and lower hinge elements designed to attach to compliment hinge elements attached to the door. The intermediary member is disposed inside a cavity formed on the vertical frame member. The intermediary member is selectively held inside the cavity by an electro-mechanic unlocking system that is coupled to a sensor located in the motor vehicle. In a second embodiment, the system includes an optional intermediate expulsion means used to force the intermediate member out of the cavity immediately after the electro-mechanic locking and unlocking system releases the intermediate member from the vertical frame member.

In the preferred embodiment, the intermediate member is a rectangular structure with two tongue slot openings formed on its top and bottom surfaces. The electro-mechanic locking and unlocking means comprises of two locks located inside the cavity opposite the top and bottom surfaces when the intermediate member is disposed inside the cavity. Each lock includes a moveable tongue that moves longitudinally to engage and disengage the tongue slot formed on the adjacent surface of the intermediate member.

These two locks are designed to keep the intermediate members onto which door stationary hinge sides are fixed, in their respective cavities, as if these are permanent parts of the main body of the vehicle, when the vehicle is not involved in an accident. During an accident, the sensory system activates the locks to swiftly move the tongues out of the tongue slots thereby disconnecting the intermediate member from the cavity.

When the intermediate members are disconnected from the cavities, the doors become detachable from the motor vehicle along with stationary hinge connections side, and door hinge sides, whether the door hinges are damaged as a result of the accident and therefore cause additional difficulty in opening the doors, or not. In the second embodiment, the expulsion comprises a set of springs located between the inside surface of the vertical frame member and the intermediate member. When the intermediate member is disconnected from the vertical frame member, the spring forces the intermediate member outward from the cavity thereby completely and automatically disengaging the door from the motor vehicle.

Located inside the cavity of the vertical frame member are guides that temporarily keep the intermediate member aligned inside the cavity after the locks have released the intermediate member. In the first embodiment, the guides are plastic fasteners that can be broken when the intermediate member is manually forced outward from the cavity.

Before explaining the embodiments of the invention in detail, it is to be understood that the invention is not limited in its application to the details of construction and to the arrangements of the components set forth in the following description or depicted in the drawings. The invention is capable of other embodiments and of being practiced and applied in various other ways. Also, it is to be understood that the wording and terminology employed herein are for the purpose of description and should not be regarded as limiting.

It should also be understood that the embodiments shown herein disclosed the preferred embodiment of the invention and do not limit the invention. Therefore, those skilled in the art will appreciate that the idea, upon which the disclosure is based, may be utilized for the design of other systems and methods to apply for several purposes of the present invention. Therefore, it is important that the claims be considered as including such equivalent meanings.

This device and the method mentioned heretofore have novel features that result in a new device and method for motor vehicle accidents, which is not anticipated, rendered obvious, suggested, or even implied by any of the prior art rescue devices, either alone or in any combination thereof.

DETAILED DESCRIPTION OF THE INVENTION

Figure 1:
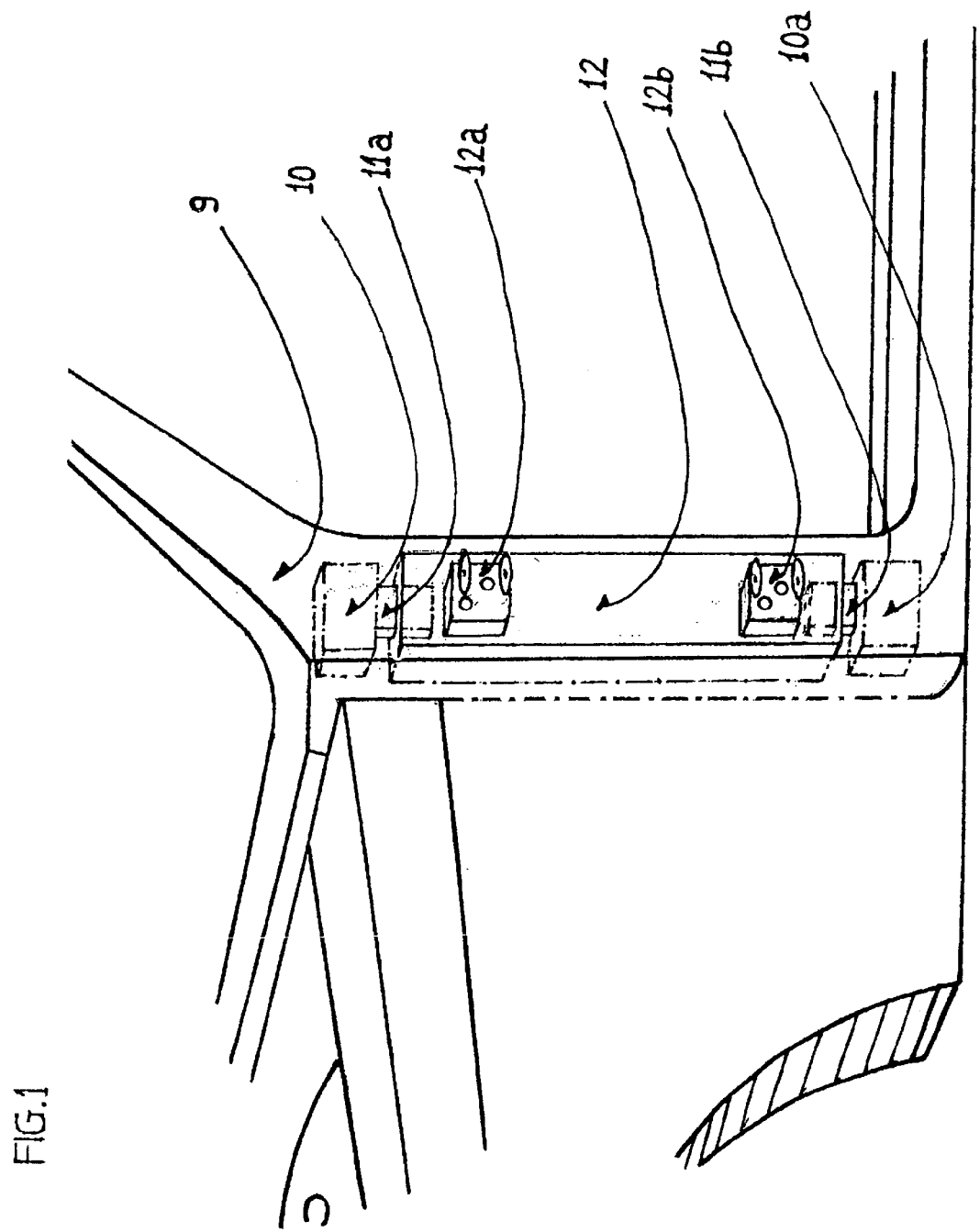
FIG. 1 shows in perspective view, the two locks used in the electro-mechanic locks and unlock system, that are within the front lower pillar and that are at locked, non - accident position, of which the locking function is to unlock the intermediate member, which in turn has the front door stationary part, upper and lower hinges fixed on it.

With reference to FIG. 1, the electro mechanic locks-solenoids 10 and 10*a* are within front lower left and right front pillars 9, and are at locked non—accident position, of which the lock tongues 11*a* and 11*b* keep the intermediate member 12 locked, onto which the front doors upper stationary hinge part 12*a* and lower stationary hinge 12*b* are fixed on the external surface. The electro-mechanic locks-solenoids 10 and 10*a* are capable of unlocking the intermediate member 12 immediately onto which upper stationary hinge 12*a* and lower stationary part 12*b* of the front door 12*g* are fixed. With regards to the parameters of swiftness, the present invention activation, that is the unlocking mechanism can be compared to the fastest air bag system. That means it would unlock within few milliseconds; in less than 1/10 of a second, inclusive sensing the impact and completion of activation of unlocking. In the second embodiment, intermediate member 12 is ready to be expelled out by the springs 19*a* and 19*b* that are used in place instead of the plastic fasteners 13*a* and 13*b*. In the second embodiment, the time for unlocking and expulsion of the intermediate members 12 is as fast as the first embodiment, since the expulsion of the intermediate members take place concurrently with respect to timing.

Figure 2:
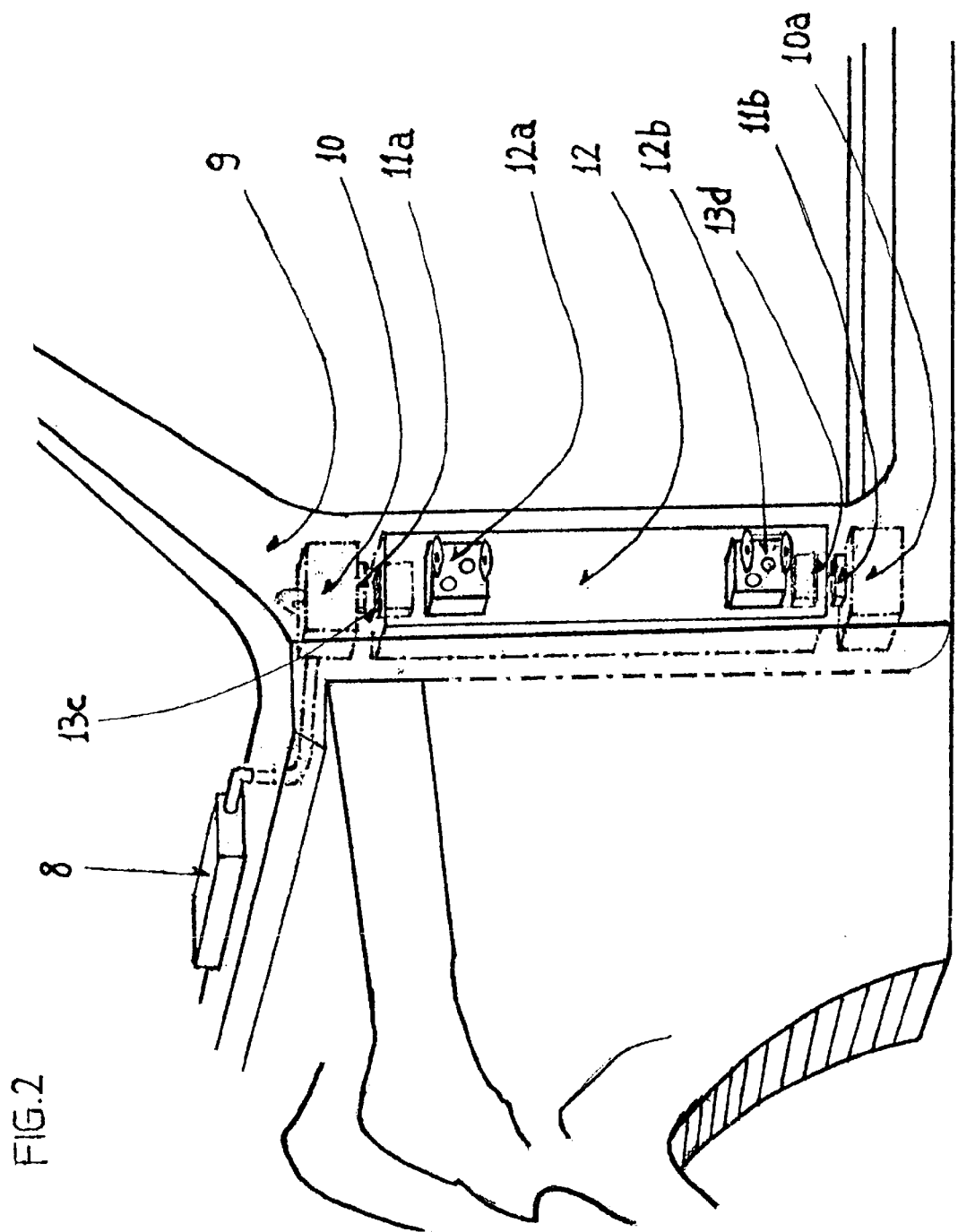
FIG. 2 shows in perspective view, the electro mechanic locks being unlocked, as the motor vehicle gets into an accident and the locks that used to be within the intermediate members are swiftly moved to the unlocked position.

With reference to FIG. 2, when the solenoid electro mechanic devices 10 and 10*a* are activated by the accident sensor 8, in less than a second tongues, 11*a* and 11*b* are unlocked and the intermediate member 12 is set free from tongues 11*a* and 11*b*. As locking tongues 11*a* and 11*b* are out of the intermediate member 12, out of tongue cavities 13*c* and 13*d*, the intermediate member 12 can be detached easily from the cavity 13 that is out of the front pillar 9 by the rescue personnel, whether the front door 12*g* is jammed at its frame or not. In the second embodiment, intermediate member 12 gets expelled out automatically.

Figure 3:
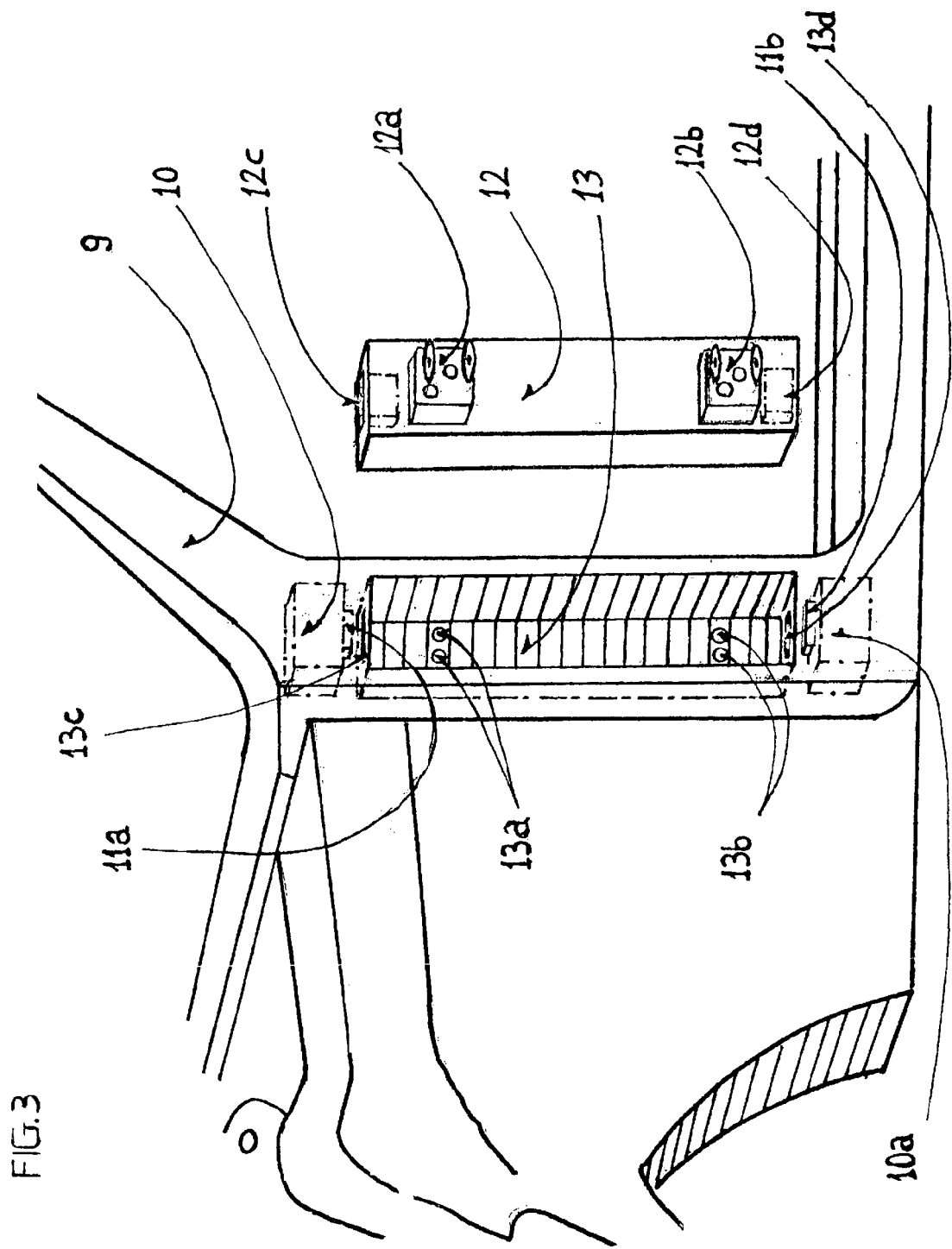
FIG. 3 shows in perspective view, how the intermediate member onto which the front doors stationary part, upper and lower hinges are fixed, are removable after these are unlocked. This is first embodiment.

With reference to FIG. 3, as the electro mechanic locking tongues 11*a* and 11*b* are removed out of the intermediate member 12 and the intermediate member 12 is set free from locking tongues 11*a* and 11*b*, this makes intermediate member 12 to be removed easily out from its cavity 13 in the front lower pillars 9 of the vehicle, for the purpose to take the font door 12*g* out. The slots, out of which tongues 11*a* and 11*b* become unlocked are 13*c* and 13*d* respectively. Since the intermediate member 12 has the door upper hinge 12*a* and lower hinge 12*b* fixed on it, front door 12*g* can be removed out easily with minor effort that can break the plastic fasteners 13*a* and 13*b*, these plastic fasteners are made by Emhart which is a known company in automotive fastener market. An exact type of fastener for the purpose of the invention can be produced by this company or by another fastener producer. Thus, even if door 12*g* is jammed at the frame or there is damage to the door as well, the door 12*g* can still be detached. The function of the plastic fasteners 13*a*, 13*b* are to temporarily hold the intermediate member 12 after unlocking occurs. After unlocking, the intermediate member 12 and 14 are held stable by plastic fasteners 13*a*, 13*b* for intermediate member 12 and by plastic fasteners 15*a* and 15*b* for intermediate member 14, temporarily. The plastic fasteners 13*a* and 13*b* are within the intermediate member cavity 13, where the inner surface of the cavity 13 faces the front lower pillars 9 of the car. Likewise, the plastic fasteners 15*a* and 15*b* are within the intermediate member cavity 14, where the inner surface of the cavity 14 faces the middle pillars 9*a* of the vehicle.

Figure 4:
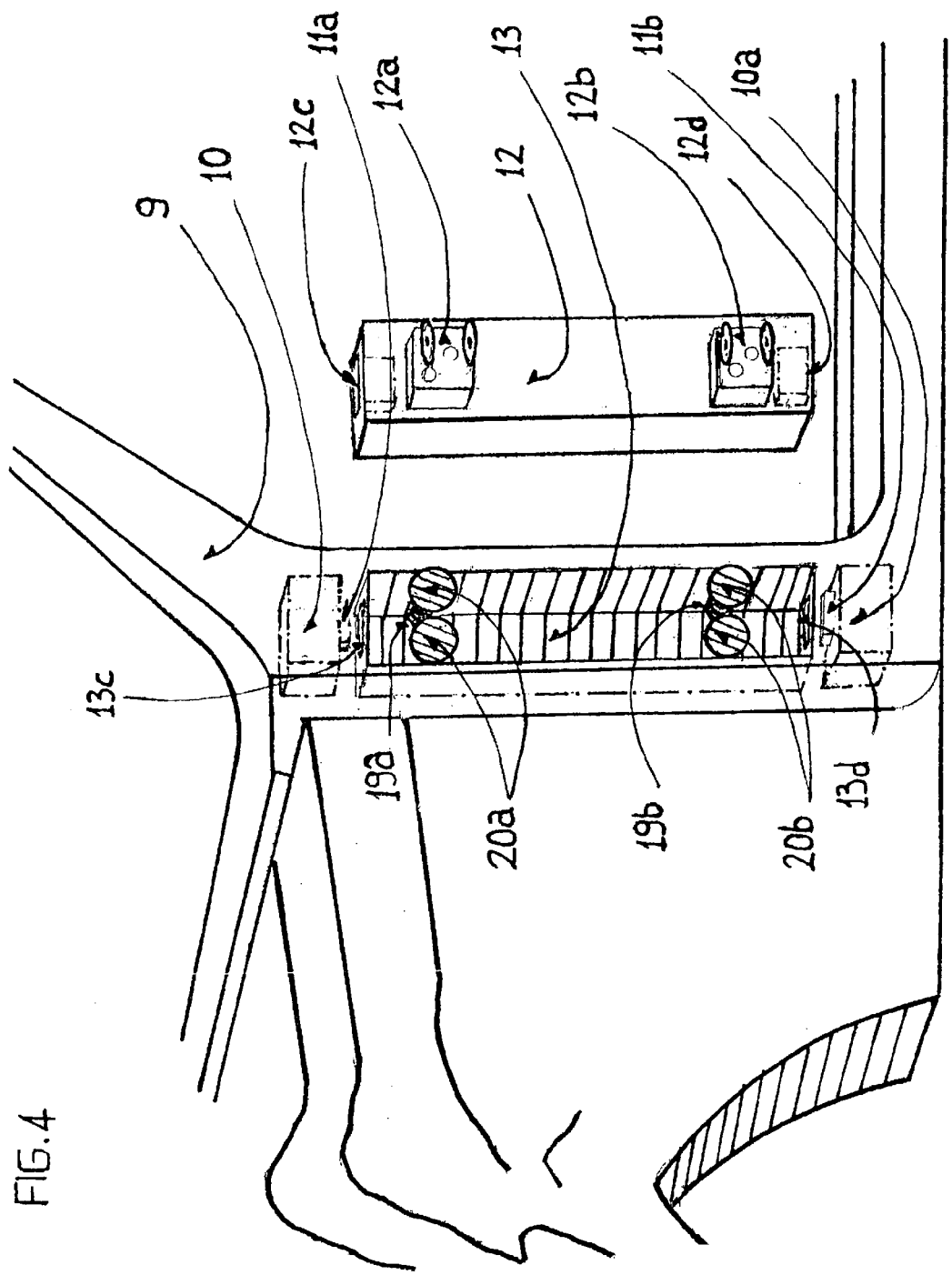
FIG. 4 shows in perspective view how the intermediate member component gets expelled immediately by the second embodiment with the spring expulsion feature that is used instead of the plastic fasteners.

With reference to FIG. 4, in the second embodiment, instead of plastic fasteners 13*a*, 13*b*, there are expulsion springs 19*a* and 19*b*, which push out the intermediate member 12 immediately right after unlocking occurs.

Figure 5:
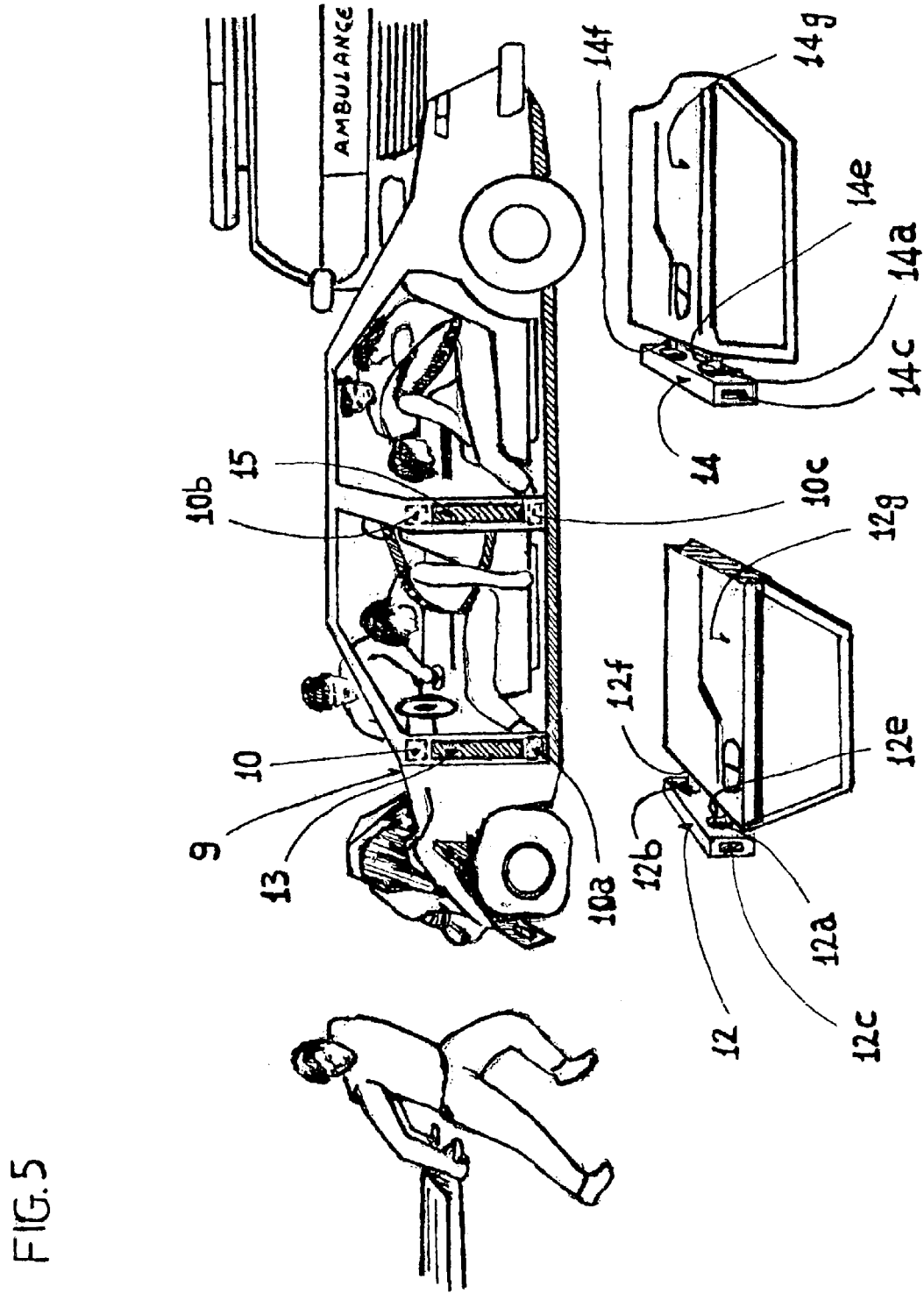
FIG. 5 shows in perspective side view, how the doors has been removed as per first embodiment or has been automatically expelled as per the second embodiment and the medical rescue personnel are able to make a swift rescue operation that saves them valuable time.

With reference to FIG. 5, after an accident with injured vehicle operator and passengers, the vehicle has structural damage, but since the electro-mechanic devices 10, 10*a*, 10*b* and 10*c* have already unlocked the intermediate members 12 and 14 in less than a second as the impact occurred, the front doors 12*g* and back doors 14*g* become removable and can be removed out easily by rescue personnel after an accident, for quick freeing of the injured vehicle operator and passengers, even if the doors 12*g* and 14*g* are jammed otherwise at their frames and can not be opened.

Figure 6:
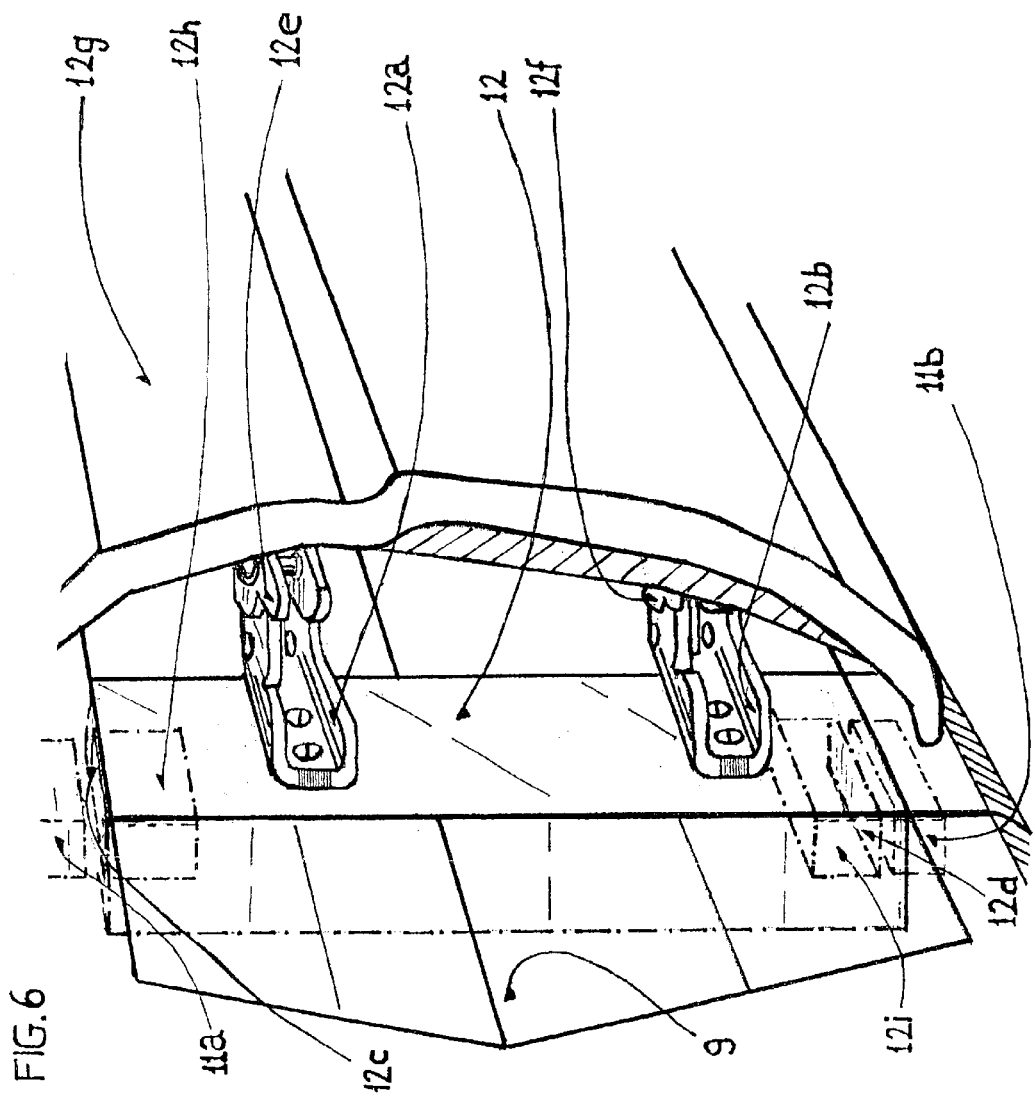
FIG. 6 is an enlarged perspective view of the intermediate member that can be removed and the hinges that are fixed on this intermediate member and therefore how the door can be removed out of from the pillars of the motor vehicle. Locking arms in the unlocked position also depicted.

With reference to FIG. 6, the electro mechanic device 10 and 10*a*, move the tongues 11*a* and 11*b*, out of slots 12*h* and 12*i* formed on the opposite ends of the intermediate member 12. As the accident occurs, tongues 11*a* and 11*b* are immediately moved out of lock slots 12*h* and 12*i*. Since the hinge 12*a* and 12*b* are fixed on the intermediate member 12, in turn the front door 12*g* can also be set free and becomes removable and can easily be detached out of the vehicle, as it is connected through the stationary hinge parts 12*a* and 12*b* and through door upper hinge part 12*e* and door lower hinge part 12*f*.

Figure 7:
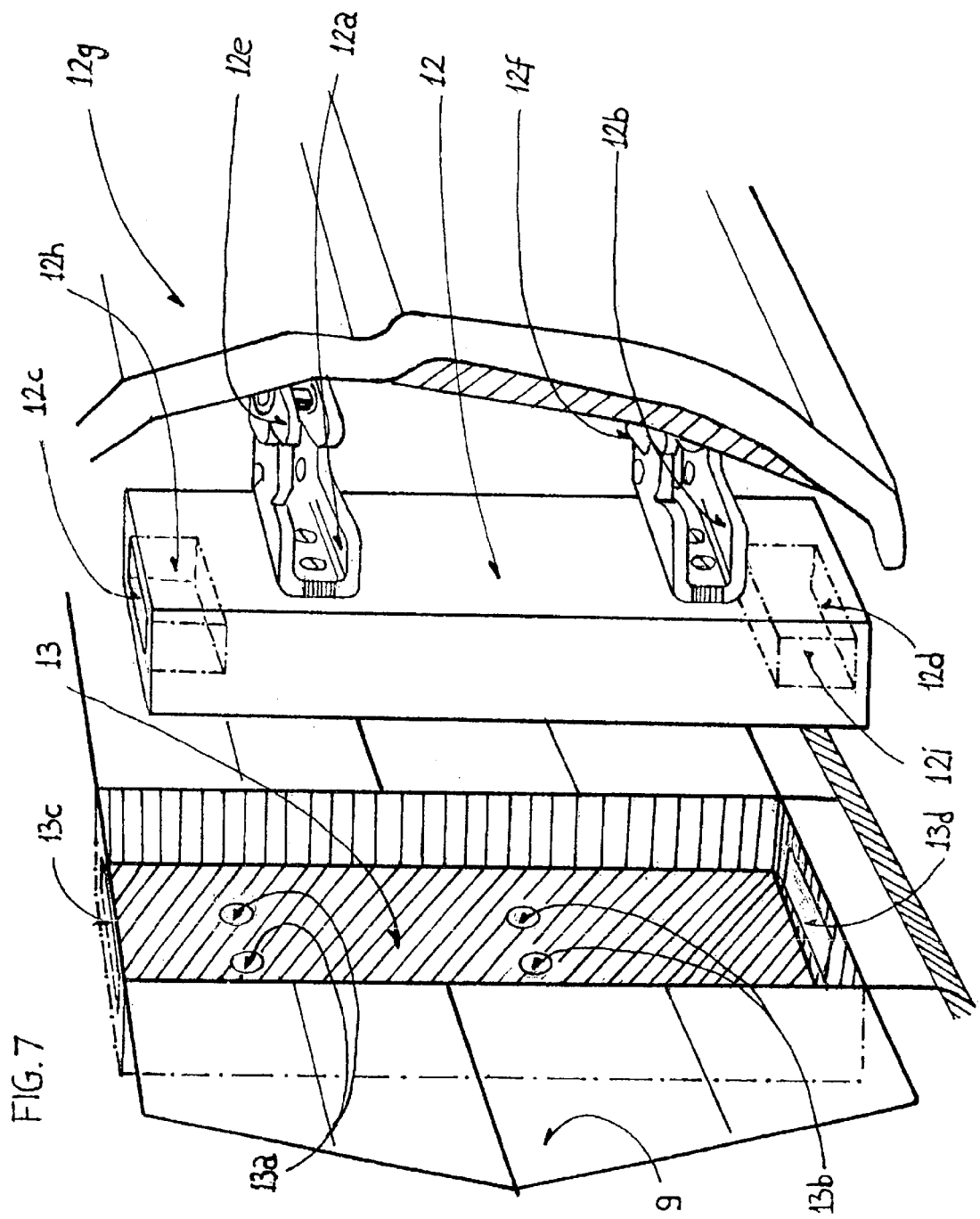
FIG. 7 is enlarged perspective view of the intermediate member and the hinges that are fixed on this intermediate member. Also depicting the cavity out of which the intermediate member is detached away from the plastic fasteners—this is the first embodiment.

With reference to FIG. 7, the intermediate member 12 can be seen as it is removed out of its cavity 13. The cavity 13 is depicted just behind the intermediate member 12, out of which intermediate member 12 has been removed. The cavity 13 has top and bottom openings 13*c* and 13*d* above and below it, that enable tongues 11*a* and 11*b* to pass through the wall of the cavity 13 and get into the lock slots 12*h* and 12*i* of intermediate member 12. This figure shows the first embodiment.

Figure 8:
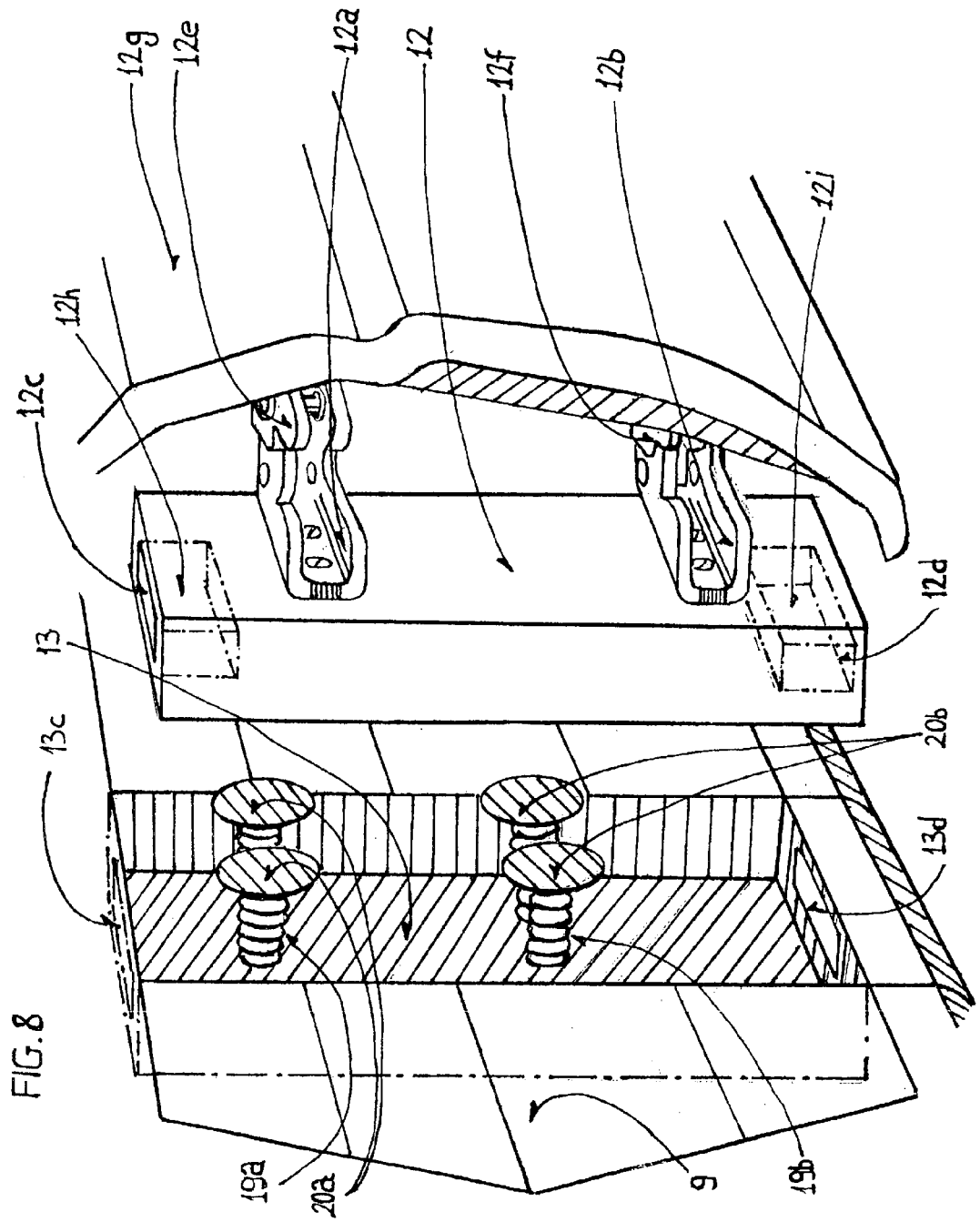
FIG. 8 is a perspective view of the second embodiment depicting how the intermediate member is expelled.

With reference to FIG. 8, the intermediary member 12 gets expelled by the expulsion springs 19*a* and 19*b* used with the second embodiment. Each expulsion spring 19*a*, 19*b* includes one circle plate 20*a* and 20*b*, respectively, that presses against the intermediate member 12.

Figure 9:
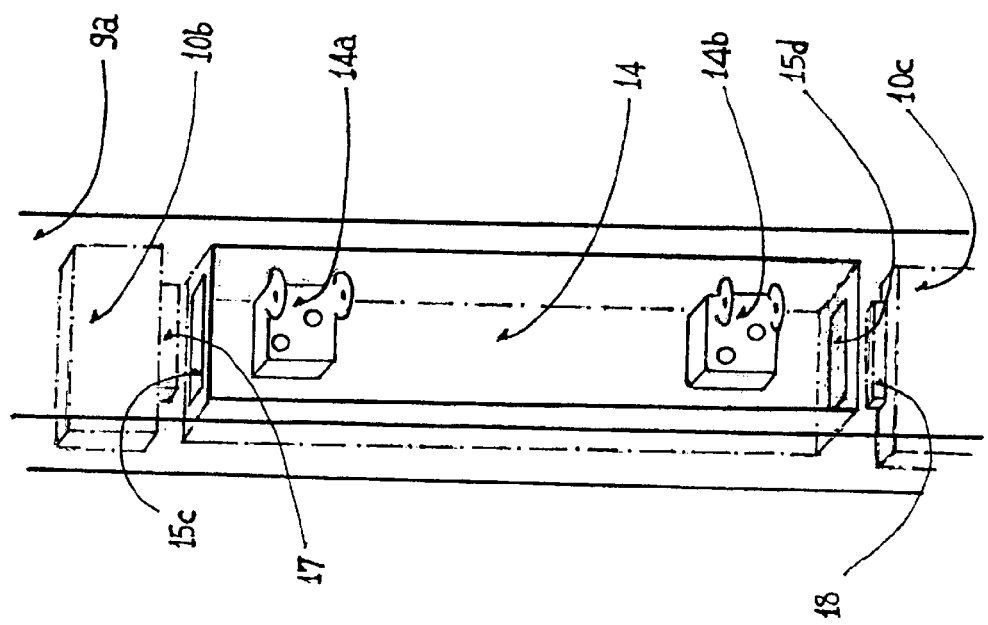
FIG. 9 is a perspective view and depicts the electro mechanic device and the intermediate member that hold the upper and lower hinges for the back doors with the side pillars.

With reference to FIG. 9, the back doors 14*g* are also made easily removable after an accident by applying the same system of electro mechanic unlocking. Upper side electro mechanic lock 10*b* and lower side lock 10*c* and their tongues 17 and 18, are placed within the middle pillars 9*a* of the automobile, tongues 17 and 18 keep the intermediate member 14 in its cavity 15, in the locked position, when the vehicle is not involved in an accident. On the external surface of intermediate member 14 are the upper back door hinge 14*a* and lower door hinge 14*b* fixed. In the first embodiment, in an accident, the tongues 17 and 18 are moved out in less than a second and the intermediate member 14 is only held by the plastic fasteners 15*a* and 15*b*, which can easily be broken by the rescue personnel by pulling the door out at the hinge sides. Same system is applied on both right and left back door 14*g* sides.

Figure 10:
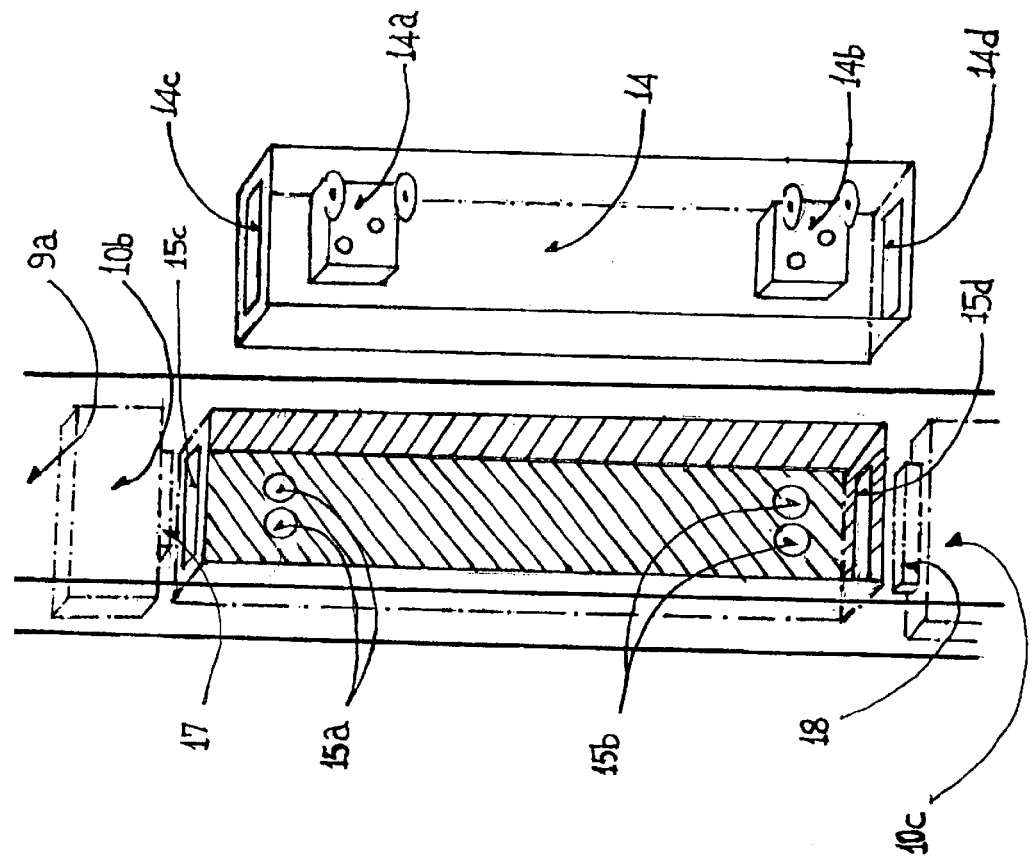
FIG. 10 is a perspective view of the intermediate member on which the hinges are fixed, how it gets detached from its cavity that is within the side pillars.

With reference to FIG. 10, within the side pillars 9*a* are the cavities 15-left and right-, within which the intermediate member 14 is located. Intermediate member 14 gets unlocked by electro mechanic tongues 17 and 18 when an accident occurs. Since the back door upper stationary hinges 14*e* and lower hinge 14*f* are fixed on the intermediate member 14 through door hinges 14*a* and 14*b*, the door 14*g* becomes easily removable from the middle pillar-body 9*a* of the vehicle. This is the first embodiment.

Figure 11:
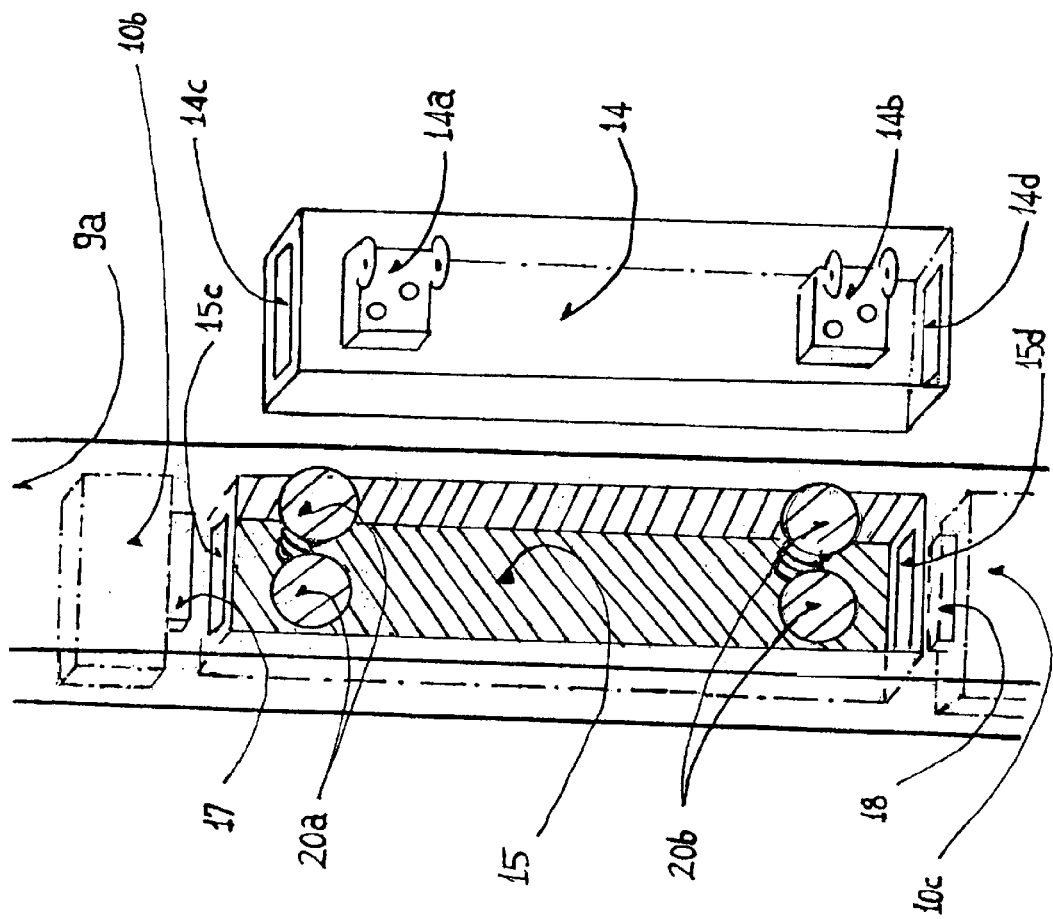
FIG. 11 is a perspective view of the intermediate member of the side middle pillars, 12 on which the hinges are located.

With reference to FIG. 11, within the middle pillars 15, instead of the plastic fasteners 15*a* and 15*b*, are the expulsion spring plates 20*a* and 20*b* that push against the intermediate member 14. This shows the second embodiment.

Figure 12:
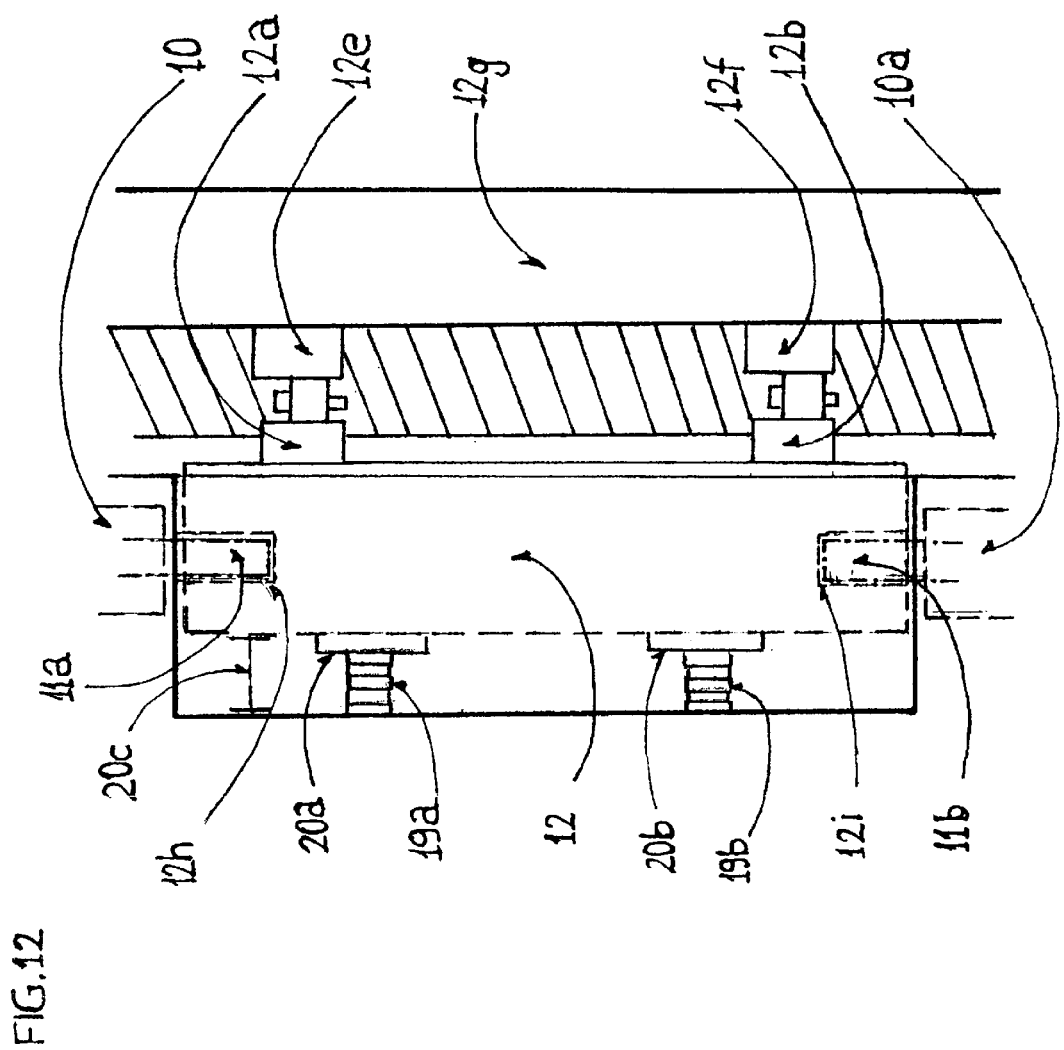
FIG. 12 is a front elevation view of the cavity and the intermediate member depicting the additional space-depth needed for the spring members in the second embodiment.

With reference to FIG. 12, in the second embodiment, within the cavity 13 is the intermediate member 12 with the spring expulsion members 19*a* and 19*b* and their spring plates 20*a* and 20*b* that push against the intermediate member 12. The depth of the cavity 13 has to be slightly greater to accommodate the expulsion springs 19*a* and 19*b* and their plates 20*a* and 20*b*. The extra depth of cavity 13 is depicted as length 20*c*. Same extra depth 20*c* needed applies to the back door cavities 15 as well.

Also disclosed herein is of loading and unloading cargo from a motor vehicle comprised of the following steps:

a. assembling a door attachment and detachment system on a motor vehicle, said door attachment and detachment system including a door with an upper hinge element and a lower hinge element, a vertical frame member located adjacent to a door opening on a motor vehicle, said vertical frame member including a longitudinally aligned cavity, a removable intermediate member located inside said cavity of said vertical frame member, at least two complimentary shaped door hinge elements vertically aligned and securely attached to front surface of said intermediate member capable of attaching to said upper hinge element and lower hinge element on said door, two electromechanical locks located inside said cavity formed in said vertical frame member, said locks being used to securely hold said intermediate member inside said cavity of said frame member, and a sensor located in the motor vehicle and coupled to said locks, said sensors capable of detecting an impact and transmitting a signal to said locks to detach said intermediate member from said cavity when an impact occurs b. selecting cargo to be loaded into said motor vehicle;

c. detaching said intermediate member from said cavity of said vertical frame member thereby enabling said door to be removed;

d. loading said cargo into said motor vehicle;

e. attaching said intermediate member to said vertical frame member to attach said door to said motor vehicle;

f. delivering said motor vehicle to a desired location;

g. detaching said intermediate member from said motor vehicle to removed said door from said motor vehicle;

h. unloading said cargo from said motor vehicle; and, i. attaching said intermediate member to said motor vehicle to attach said doors to said motor vehicles.

I claim:

1. A motor vehicle door attachment and detachment system, comprising:

a. a door with an upper hinge element and a lower hinge element, b. a vertical frame member located adjacent to a door opening on a motor vehicle, said vertical frame member including a longitudinally aligned cavity;

c. a removable intermediate member located inside said cavity of said vertical frame member;

d. at least a locking/unlocking mechanism comprising two complimentary shaped door hinge elements vertically aligned and securely attached to front surface of said intermediate member capable of attaching to said upper hinge element and lower hinge element on said door;

e. two electro-mechanical locks located inside said cavity formed in said vertical frame member, said locks being used to securely hold said intermediate member inside said cavity of said frame member; and f. a sensor located in the motor vehicle and coupled to said locks, said sensors capable of detecting an impact and transmitting a signal to said locks to detach said intermediate member from said cavity when an impact occurs.

2. The motor vehicle door attachment and detachment system electro mechanic device as set forth in claim 1, further including each said lock includes a tongue that engages a slot formed on said intermediate member.

3. The motor vehicle door attachment and detachment system electro mechanic device as set forth in claim 1, wherein said door hinge elements are attached to the external surface of said intermediate member.

4. The motor vehicle door attachment and detachment system as set forth in claim 1, wherein said intermediate member is detachable from said cavity in said vertical frame member after said locks are unlocked from said intermediate member, which in turn results in the removal of the door hinges away from the motor vehicle body, therefore the door can be detached from the motor vehicle even if door is jammed at door frames, posts or locks and even if the hinges cause difficulty in opening the door and even if there is direct damage to the door as a result of a frontal or rear end or any angle side impact accident, therefore saving rescue and medical personnel time.

5. The motor vehicle door attachment and detachment system as set forth in claim 1, wherein said intermediate member is held in a fixed position in said cavity when the vehicle is involved in an accident by fasteners attached to said vertical frame member inside said cavity, said fasteners may be broken to release said intermediate member from said cavity.

6. The motor vehicle door attachment and detachment system as recited in claim 5, wherein said fasteners are made of plastic.

7. The motor vehicle door attachment and detachment system as set forth in claim 1, wherein said intermediate member is used as a means to move the door hinges with their intermediate member base on which the hinges are fixed, said intermediate member and said locking/unlocking mechanism are also applied to the back doors, where said locking/unlocking mechanism and intermediate members upper are within two side vertical frame members.

8. The motor vehicle door attachment and detachment system as set forth in claim 1, wherein said intermediate member that is unlocked and removed in the case of an accident, can be replaced and locked into its cavity along with the door after the structural damage is repaired.

9. The motor vehicle door attachment and detachment system as set forth in claim 1, further including an expulsion mechanism attached to said vertical frame member and inside said cavity to forcibly expulse said intermediate member from said cavity after said locking/unlocking mechanism, is activated to unlock said intermediate member from said cavity.

10. The motor vehicle door attachment and detachment system as recited in claim 9, wherein said expulsion mechanism includes at least one spring located between said vertical frame member and said intermediate member.

11. The motor vehicle door attachment and detachment system as set forth in claim 9, further including an activation button coupled to said expulsion means that selectively controls said expulsion system.

12. The motor vehicle door attachment and detachment system, as set forth in claim 2, wherein said intermediate member is only held inside the cavity by said tongues, thereby enabling the door to be removed and attached to said vehicle without the use of nuts and bolts and having to disengage the hinges.

* * * * *

UNITED STATES PATENT AND TRADEMARK OFFICE
CERTIFICATE OF CORRECTION

PATENT NO. : 6,860,542 B1
DATED : March 1, 2005
INVENTOR(S) : Fikret M. Zabtcioglu It is certified that error appears in the above-identified patent and that said Letters Patent is hereby corrected as shown below:

<u>Column 8,</u>
Line 35, replace "upper are within two side vertical frame members," with
-- -upper and lower parts - are within the two side vertical frame members. --

Signed and Sealed this

Twenty-sixth Day of April, 2005

JON W. DUDAS
*Director of the United States Patent and Trademark Office*